United States Patent
Wang et al.

(10) Patent No.: US 6,500,497 B1
(45) Date of Patent: Dec. 31, 2002

(54) METHOD OF MAGNETICALLY PATTERNING A THIN FILM BY MASK-CONTROLLED LOCAL PHASE TRANSITION

(75) Inventors: Jian-Ping Wang, Singapore (SG); Tie Jun Zhou, Singapore (SG); Tow Chong Chong, Singapore (SG)

(73) Assignee: Data Storage Institute (SG)

( * ) Notice: Subject to any disclaimer, the term of this patent is extended or adjusted under 35 U.S.C. 154(b) by 0 days.

(21) Appl. No.: 10/126,007

(22) Filed: Apr. 19, 2002

(30) Foreign Application Priority Data

Oct. 1, 2001 (SG) ........................................ 200106033-4

(51) Int. Cl.[7] ................................................ B05D 1/28
(52) U.S. Cl. ...................... 427/528; 427/127; 427/128; 427/130; 427/131; 427/132; 427/259; 427/282; 427/287; 427/314; 427/318; 427/372.2; 427/383.1; 427/383.7; 427/399; 427/402; 427/404; 427/405; 427/419.1; 427/444; 427/526; 427/531; 427/533; 427/552; 427/555; 427/556; 427/595; 427/596; 427/597
(58) Field of Search ................................. 427/528, 127, 427/128, 130, 131, 132, 259, 282, 287, 314, 318, 372.2, 383.1, 383.7, 399, 402, 404, 405, 419.1, 444, 526, 531, 533, 552, 555, 556, 595, 596, 597

(56) References Cited

U.S. PATENT DOCUMENTS 5,693,426 A 12/1997 Lee et al.
5,772,905 A 6/1998 Chou

FOREIGN PATENT DOCUMENTS

| EP | 0977182 | 2/2000 |
| WO | 01/72878 | 4/2001 |
| WO | 02/19036 | 3/2002 |

OTHER PUBLICATIONS

Ross et al., "Patterned media: 200Gb/in$^2$ or bust", Data Storage, pp. 41–48, Sep., 1998.
White, "The physical boundaries to high–density magnetic recording", Journal of Magnetism and Magnetic Materials, vol. 209, pp. 1–5, 2000. (No month avail.).
Chou et al. "Study of nanoscale magnetic structures fabricated using electron–beam lithograhy and quantum magnetic disk", Journal Vac. Science. Technology, B 12, PA 365, 1994. (No month avail.).
Fernandez et al., "Magnetic Force Microscopy of Single–Domain Cobalt Dots Patterned Using Interference Lithography", IEEE. TRANS. MAGN. 32, p. 4472, 1996. (No month avail.).
Kent et al., "Properties and measurement of scanning tunneling microscope fabricated ferromagnetic particle arrays (Invited)", J. Appl. Phys. 76 p. 6656, 1994. (No month avail.).

Primary Examiner—Bernard Pianalto
(74) Attorney, Agent, or Firm—Beyer Weaver & Thomas, LLP (57) ABSTRACT

A method of producing a patterned magnetic nanostructure is disclosed. The method includes providing a substrate having a non-magnetic single layer or multi layer film that can be converted into a magnetic state by annealing and/or mixing. The method further includes positioning a mask having a desired pattern and resolution associated with the patterned magnetic nanostructure on or over the film. The method additionally includes subjecting the mask-covered substrate to a beam of radiation (focussed or unfocussed) having sufficient energy to locally anneal and/or mix the non-magnetic or weak-magnetic single-layer or multi layer film. Because of the mask effect, only the desired portions of the non-magnetic film are exposed to the beam of radiation. As such, the desired portions of the non-magnetic film are changed from a non-magnetic to a magnetic state to produce an array of magnetic elements in a non-magnetic matrix. The size of each magnetic element is dependent on the resolution of mask.

34 Claims, 6 Drawing Sheets

METHOD OF MAGNETICALLY PATTERNING A THIN FILM BY MASK-CONTROLLED LOCAL PHASE TRANSITION

FIELD OF THE INVENTION

The present invention relates to nano-scale patterning techniques. More specifically, the present invention relates to methods for directly converting a non-magnetic single layer or multi layer film into a patterned magnetic nanostructure by mask-controlled local phase transition.

BACKGROUND OF THE INVENTION

Conventionally, a magnetic recording medium for a hard disk is produced by sputter depositing a Co-alloy thin film on a chromium-based underlayer, as disclosed for example in U.S. Pat. No. 5,693,426. The term "underlayer" refers to a layer of thin film, which is deposited below the magnetic layer of a recording medium. The purpose of an underlayer is to provide favorable crystalline growth conditions for the magnetic layer and to achieve many useful recording properties. In the current magnetic recording materials, the underlayers are made of NiAl layer and a Cr layer.

The magnetization vectors written on such disks lie in the plane of the film and are not stable enough at higher densities. Therefore, the current media are not expected to support densities higher than 300 Gb/in$^2$ (see, for example, DATA STORAGE, p. 41–48, Sepetember 1998). Different alternatives such as perpendicular magnetic recording (in which the magnetization vectors of the written bits lie perpendicular to the film and are more stable), or patterned structures of elements (patterned media) are sought for high-density recording media.

Problems with writing on perpendicular medium prevent perpendicular recording from taking off despite its promise of higher densities with respect to longitudinal recording (see, for example, J. MAGN. MAGN. MATER., vol. 209, p. 1–5, 2000). The patterned structures of magnetic nanoelements offer thermal stability, good signal/noise at high densities (media noise determined primarily by lithography) and a huge advantage for tracking, both through built-in patterns and one-pass servowriting.

So far, techniques such as electron or ion beam lithography (see, for example, J. VAC. SCI. TECHNOL. B 12, pa. 3695, 1994), laser interferometry (see, for example, IEEE. TRANS. MAGN. 32, P. 4472, 1996), and nanoimprint lithography (NIL) (see, for example, U.S. Pat. No. 5,772,905) have been employed for producing patterned nanostructures. Patterned nanostructures have also been fabricated using an atomic force microscope or a scanning tunneling microscope (see, for example, J. APPL. PHYS., Vol. 76, P. 6656, 1994). Unfortunately, however, these methods have not been suitable for mass production. With electron (ion) beam lithography, a number of processing steps are typically involved, the production rate is slow, and the cost is high. NIL also involves many processing steps. As such, it is generally believed that there are no viable technologies for fabricating patterned nanostructures, and more particularly patterned arrays, with the dimensions required for the individual elements over an area large enough to contribute to useful memory and with low cost.

In view of the foregoing, it is the aim of the present invention to provide an alternative method of fabricating patterned nanostructures.

SUMMARY OF THE INVENTION

The invention relates, in one embodiment, to a method of converting a potentially magnetic material into a magnetic patterned nanostructure by using mask-controlled local phase transition. The term "potentially magnetic" generally refers to a non-magnetic state that can be converted into a magnetic state, i.e., the non-magnetic state has the "potential" to turn into a magnetic state. In most cases, the phase transition is implemented by local annealing and/or mixing of a non-magnetic or weak-magnetic film having a single or multiple layer.

The invention relates, in another embodiment, to a method of producing a patterned magnetic nanostructure. The method includes providing a substrate having a non-magnetic single layer or multi layer film that can be converted into a magnetic state by annealing and/or mixing. The method further includes covering the substrate with a mask having a desired pattern and resolution associated with the patterned magnetic nanostructure. The method also includes transferring the desired pattern from the mask to the film by converting desired portions of the non-magnetic film to a magnetic state via annealing and/or mixing.

The invention relates, in another embodiment, to a method of producing a patterned magnetic nanostructure. The method includes providing a substrate having a single layer or multi layer film that can be converted into a magnetic state by annealing and/or mixing. The method further includes positioning a mask on or over the film. The mask has a desired pattern and resolution associated with the patterned magnetic nanostructure. The method additionally includes subjecting the mask-covered substrate to a beam of radiation having sufficient energy to locally anneal and/or mix the non-magnetic or weak-magnetic single-layer or multi layer film. Because of the mask, only desired portions of the non-magnetic film are exposed to the beam of radiation to produce an array of magnetic elements in a non-magnetic matrix.

DETAILED DESCRIPTION OF THE INVENTION

It is the aim of the present invention to provide an alternative method of fabricating patterned nanostructures by directly converting a non-magnetic single or multi layer film into a patterned magnetic nanostructure using mask-controlled local phase transition. The invention is particularly suitable for mass production in high-density magnetic recording and magnetic submicron devices such as read head, memory cell, and the like.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
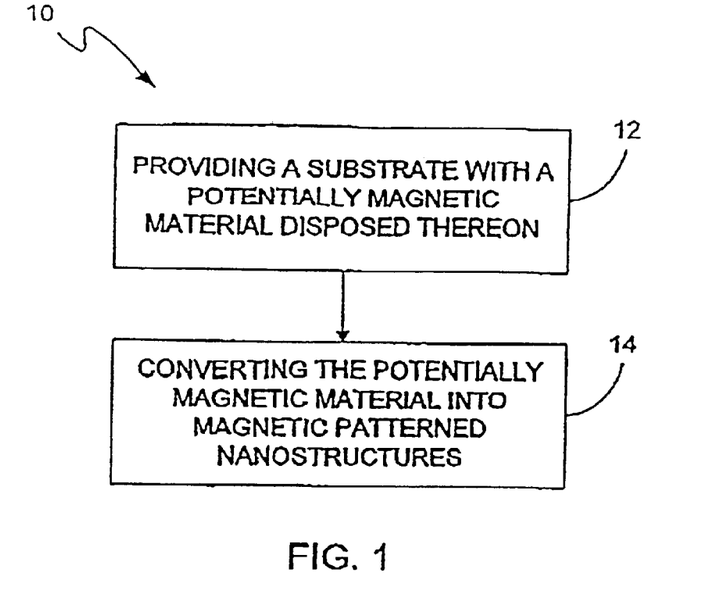
FIG. 1 is a flow diagram illustrating a method of fabricating patterned nanostructures, in accordance with one embodiment of the present invention.

FIG. 1 is a flow diagram illustrating a method 10 of fabricating patterned nanostructures, in accordance with one embodiment of the present invention. The method 10 begins at step 12 where a substrate having a potentially magnetic material disposed thereon is provided. Potentially magnetic materials are materials that can be converted from a non-magnetic state or weak magnetic state (i.e., they do not possess magnetization in a zero magnetic field) to a magnetic state. The term "magnetic state" generally refers to the state that exhibits ferromagnetism or ferromagnetism. The potentially magnetic material may be disposed on the substrate as a single or multilayer non-magnetic thin film. Examples of potentially magnetic materials will be given below.

After providing the substrate with a potentially magnetic material disposed thereon, the process flow proceeds to step 14 where select portions of the potentially magnetic material are converted into a magnetic state. This is typically done to produce patterned magnetic nanostructure comprising an array of magnetic nano-elements in a non-magnetic matrix, i.e., an ordered array of magnetic regions separated by non-magnetic regions. In one embodiment, the conversion is implemented using mask-controlled local phase transition that is carried out by annealing (e.g., heating) and/or mixing the potentially magnetic material. In general, annealing and mixing promote the crystallization and/or alloying of the potentially magnetic material, which as a result changes the physical properties of the potentially magnetic material from a non-magnetic to a magnetic state. During annealing, the potentially magnetic material is heated and slow cooled. During mixing, the multiple layers of the potentially magnetic material are combined via heat into one part thereby rendering the constituent parts (different layers) indistinguishable.

Examples of potentially magnetic materials that may be annealed to obtain the necessary crystalline structure in which films become ferromagnetic or ferrimagnetic are Barium (Ba)-ferrite, Srontium (Sr)-ferrite, garnets, Cobalt (Co)-ferrite, Co-Zinc (Zn) ferrite and the like. Ba-ferrite, Sr-ferrite and garnets tend to undergo this transition at higher temperatures such as 800 degrees C. while Co and Co-Zn ferrites tend undergo this transition at lower temperatures such as 400 degrees C. Furthermore, potentially magnetic materials that may be annealed and mixed to form an alloy in which films become ferromagnetic or ferrimagnetic are manganese (Mn), aluminum (Al), bismuth (Bi), chromium (Cr), platinum (Pt), carbon (C), cobalt (Co), nickel (Ni), iron (Fe), yttrium (Y), palladium (Pd) and the like. Some combinations of the above materials, which can be converted into a magnetic state by annealing and mixing at appropriate temperatures include Mn/Al, Mn/Bi and Cr/Pt. It should be noted that these examples are not a limitation and that other materials or combinations of materials that exhibit both a non-magnetic state and a magnetic state when annealed and/or mixed may be used.

Figure 2:
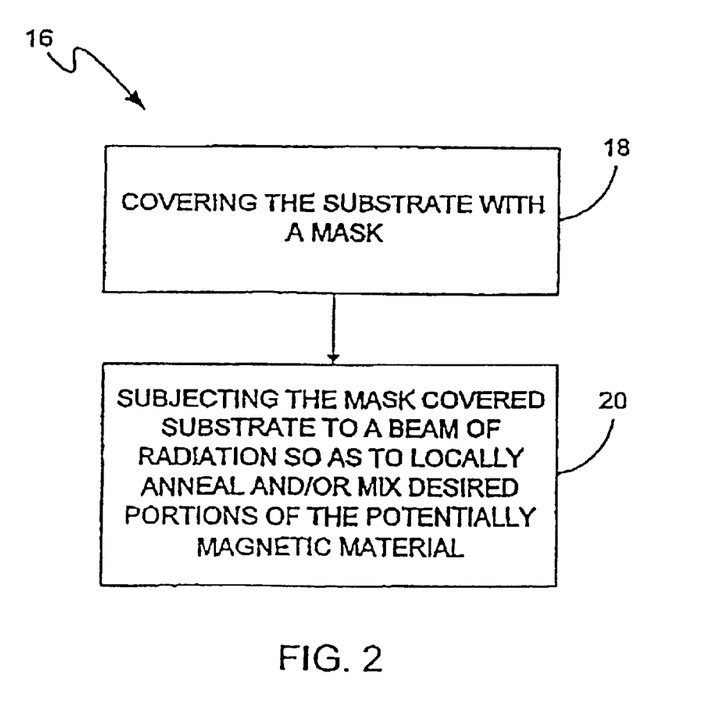
FIG. 2 is a flow diagram illustrating a method of converting select portions of the potentially magnetic material into a magnetic state, in accordance with one embodiment of the present invention.

FIG. 2 is a flow diagram illustrating a method 16 of converting select portions of the potentially magnetic material into a magnetic state, in accordance with one embodiment of the present invention. By way of example, the method 16 may generally correspond to step 14 in FIG. 1. The method 16 begins at step 18 where a substrate having a potentially magnetic film (e.g., single or multi layer) disposed thereon is covered with a mask. The mask is configured for creating patterned magnetic nanostructures by transferring a pattern from the mask to the potentially magnetic film (e.g., masked controlled). The pattern, which has dimensions required the individual elements over a large area, is typically written to the mask via a lithography process such as electron beam, ion beam, X-ray, or laser interferometric lithography. The resolution of the mask typically determines density of the nanostructures, i.e., the size of each magnetic element is dependent on the resolution of mask. The mask may be placed on or over a certain distance from the surface of the film so as to project a shadow of the mask onto the film.

After covering the substrate with the mask, the process flow proceeds to step 20 where the mask-covered substrate is subjected to a beam of radiation to locally anneal and/or mix the selected portions of the potentially magnetic film. That is, a beam of radiation (focussed or unfocussed) is made incident on the masked cover film thus exposing the uncovered portions of the potentially magnetic film to the beam of radiation. By way of example, the beam of radiation may be an electron beam, ion beam, X ray, laser beam or the like. The radiation that hits the potentially magnetic film is configured to anneal (e.g., heat) and/or mix the potentially magnetic film thus changing its properties from a non-magnetic state to a magnetic one. The radiation does not affect the parts of the film that are hidden from the radiation by the mask shadow. That is, only the portions of the material exposed by the beam of radiation undergoes a transformation of the crystal structure or alloying of the different elements (e.g., layers). In this way, the pattern is transferred from the mask to the film and an array of magnetic nanoelements spread in a non-magnetic matrix can be produced. For example, a desired pattern for high density magnetic recording and magnetic submicron devices may be transferred from the mask to the film. By repeating this process, thousands of almost identical patterns can be produced. Unlike current methods for producing patterned media, the method of the present invention is suitable for mass production with high reproduction and low cost. For instance, some current methods write patterns via a point by point process that is too slow and therefore the throughput is not suitable for mass production.

In some cases, the beam of radiation is scanned across the mask-covered substrate, i.e., the masked-covered substrate is moved across the beam or radiation or the beam of radiation is moved across the masked-covered substrate. In other cases, the beam of radiation and the masked-covered substrate are fixed, i.e., the masked-covered substrate is placed in front of the beam. By way of example, the later case be used when the spot size of the beam is large or when the substrate is small (e.g., magnetic submicron devices).

Figure 3:
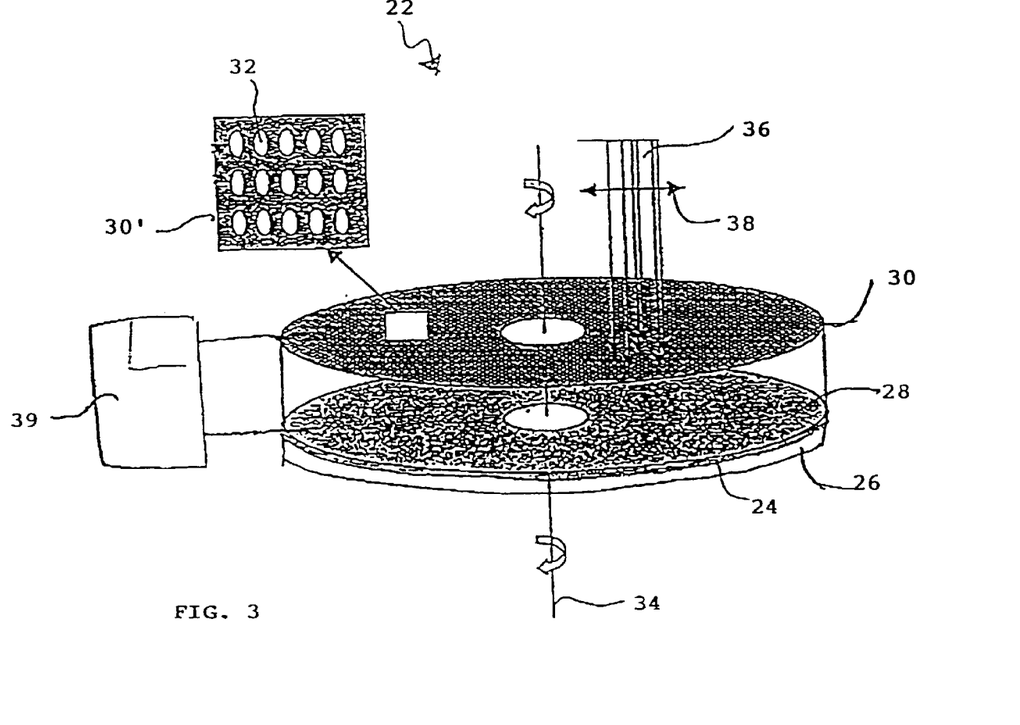
FIG. 3 is a perspective view illustration of a method of fabricating patterned nanostructures, in accordance with one embodiment of the present invention.
Figure 4:
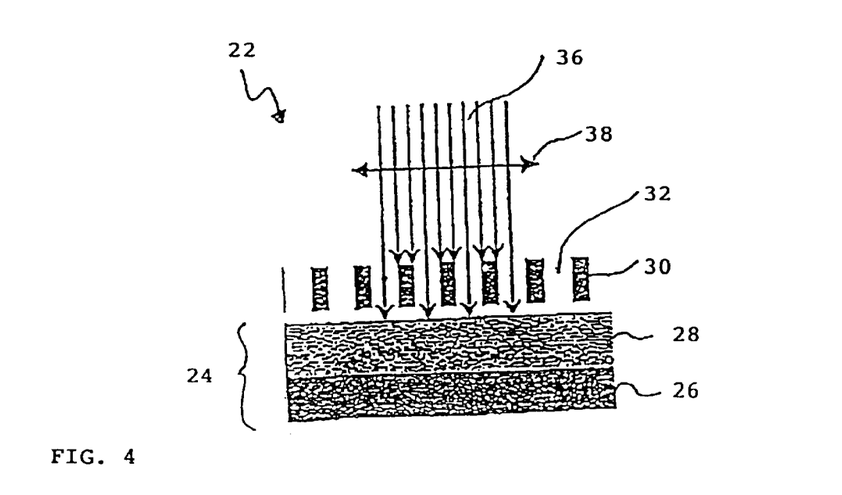
FIG. 4 is a side view illustration of a method of fabricating patterned nanostructures, in accordance with one embodiment of the present invention.

FIGS. 3 & 4 are schematic illustrations of a method 22 of fabricating patterned nanostructures on a substrate 24, in accordance with one embodiment of the present invention. In the illustrated embodiment, the substrate 24 is disk shaped (e.g., circular). It should be noted, however, that this is not a limitation and that the shape may vary according to the specific needs of each device. As shown, the substrate 24 includes a base 26 and a potentially magnetic material 28 disposed thereon. The potentially magnetic material 28 represents a non-magnetic material (or weakened magnetic material) that can be converted into a magnetic state by annealing and/or mixing. In some cases, the potentially magnetic material 28 is a single layer film, and in other cases, the potentially magnetic material 28 is a multi layer film. In the illustrated embodiment, the substrate 24 is covered by a mask 30 that is fixed to the substrate 24. The mask may be placed on or over a certain distance from the surface of the film so as to project a shadow of the mask onto the substrate. The shape of the mask generally corresponds to the shape of the substrate, and therefore in FIG. 3 the shape of the mask is also disk shaped. The mask 30 is typically patterned with a plurality of holes or openings 32 that are configured to create patterned nanostructures in the potentially magnetic material 28 when a beam of radiation 36 is applied thereto. As should be appreciated, the size of each magnetic element in the patterned nanostructure is dependent on the size of the mask opening 32.

In this particular embodiment, the mask 30 and the substrate 24 are rotated about an axis 34 while scanning the beam of radiation 36 across the mask-covered substrate 24/30 in the radial direction 38. In some cases, the beam of radiation is focussed. In other cases, the beam of radiation is unfocussed. In most cases, the beam of radiation is uniform. The rotation of the substrate and the scanning of the beam is typically controlled by one or more servomechanisms 39. Although only a small portion of the mask covered substrate is scanned at any one time, the surface of the mask 30 may be sequentially exposed to the beam of radiation, thereby allowing a pattern to be built up on the substrate 24, and more particularly the potentially magnetic material 28. That is, because of the mask effect, only desired portions of the non-magnetic materials are exposed to the radiation, which has sufficient energy to locally anneal and/or mix those portions, to produce an array of magnetic elements in a non-magnetic matrix. The beam of radiation 36 (focussed or unfocussed) can be produced by electron beam, an ion beam, X-ray beam, laser beam and the like. Especially for an ion beam, annealing and mixing of a non-magnetic multi layer film can be carried out at the same time.

As stated previously, the servomechanisms are used to control the movements of the beam and the mask-covered substrate. In some cases, the beam is scanned using a set of electrostatic and magnetic lenses (e.g., for ion and electron beam). In other cases, the beam is scanned using a set of optical lenses (e.g., for laser and X-ray beams). In other cases, the mask covered substrate is moved using an X-Y stage.

Alternatively, the mask-covered substrate 24/30 may be fixed and the beam 36, under servo control, may be moved across the mask covered substrate 24/30 so that all or any selected part of the mask-covered substrate 24/30 is scanned. In addition, the beam 36 may be fixed and the mask-covered substrate 24/30, under servo control, may be moved across the beam 36 so that all or any selected part of the mask-covered substrate 24/30 is scanned.

Figure 5:
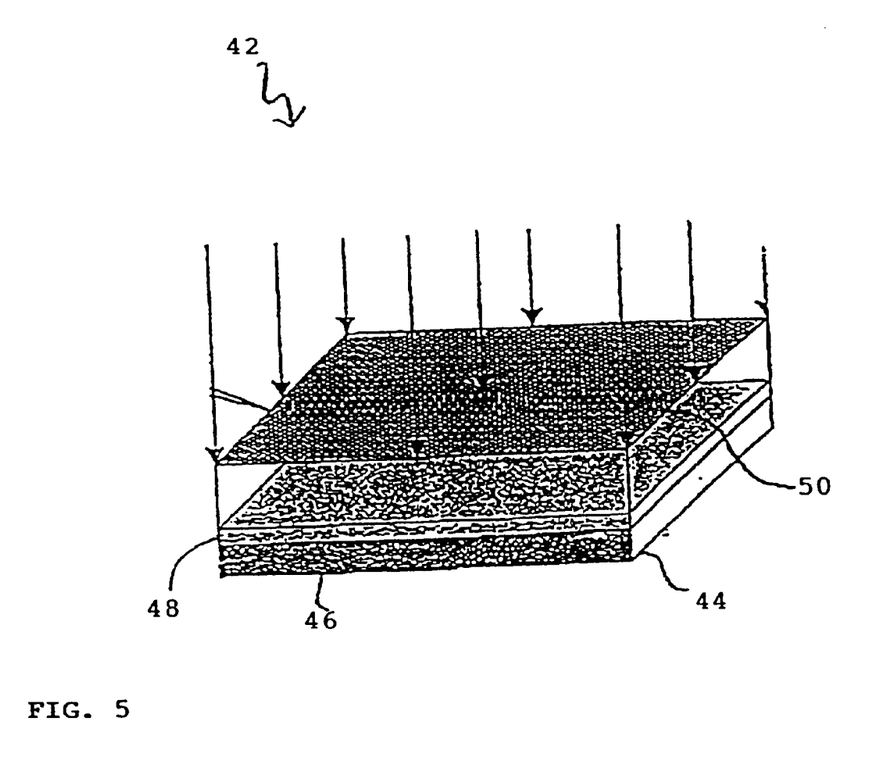
FIG. 5 is a perspective illustration of a method of fabricating patterned nanostructures, in accordance with one embodiment of the present invention.
Figure 6:
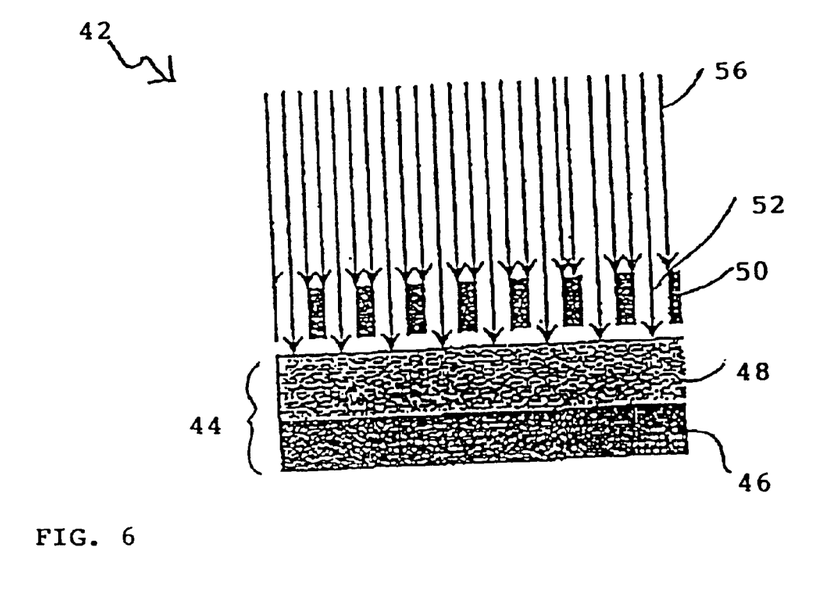
FIG. 6 is a side view illustration of a method of fabricating patterned nanostructures, in accordance with one embodiment of the present invention.

FIGS. 5 & 6 are schematic illustrations of a method 42 of fabricating patterned nanostructures on a substrate 44, in accordance with one embodiment of the present invention. In the illustrated embodiment, the substrate 44 is square shaped. It should be noted, however, that this is not a limitation and that the shape may vary according to the specific needs of each device. For example, the substrate may also be rectangular, hexagonal, triangular, circular, and the like. As shown, the substrate 44 includes a base 46 and a potentially magnetic material 48 disposed thereon. The potentially magnetic material 48 represents a non-magnetic material (or weakened magnetic material) that can be converted into a magnetic state by annealing and/or mixing. In some cases, the potentially magnetic material 48 is a single layer film, and in other cases, the potentially magnetic material 48 is a multi layer film. In the illustrated embodiment, the substrate 44 is covered by a mask 50 that is fixed to the substrate 44. The mask may be placed on or over a certain distance from the surface of the film so as to project a shadow of the mask onto the substrate. The shape of the mask generally corresponds to the shape of the substrate, and therefore in FIG. 5 the shape of the mask is also square shaped. The mask 50 is typically patterned with a plurality of openings 52 that are configured to create patterned nanostructures in the potentially magnetic material 48 when a beam of radiation 56 (or beams) is applied thereto. As should be appreciated, the size of each magnetic element in the patterned nanostructure is dependent on the size of the mask opening 52.

In this particular embodiment, the beam of radiation 56, and more particularly the beam spot (e.g., the cross sectional area of the beam) is uniform and large enough to cover the mask covered substrate 44 in its entirety and therefore the beam of radiation 56 and the mask covered substrate 44 are fixed, i.e., the mask-covered substrate is fixedly placed in front of a fixed radiation beam. This is generally the case for magnetic submicron devices that are small. As such, the mask covered substrate 44/50 may be exposed to the beam of radiation at one time, thereby allowing a pattern to be built up on the substrate 24, and more particularly the potentially magnetic material 28. That is, because of the mask effect, only desired portions of the non-magnetic materials are exposed to the radiation, which has sufficient energy to locally anneal and/or mix those portions, to produce an array of magnetic elements in a non-magnetic matrix. The beam of radiation 36 (focussed or unfocussed) can be produced by electron beam, an ion beam, X-ray beam, laser beam and the like. Especially for an ion beam, annealing and mixing of a non-magnetic multi layer film can be carried out at the same time.

Figure 7:
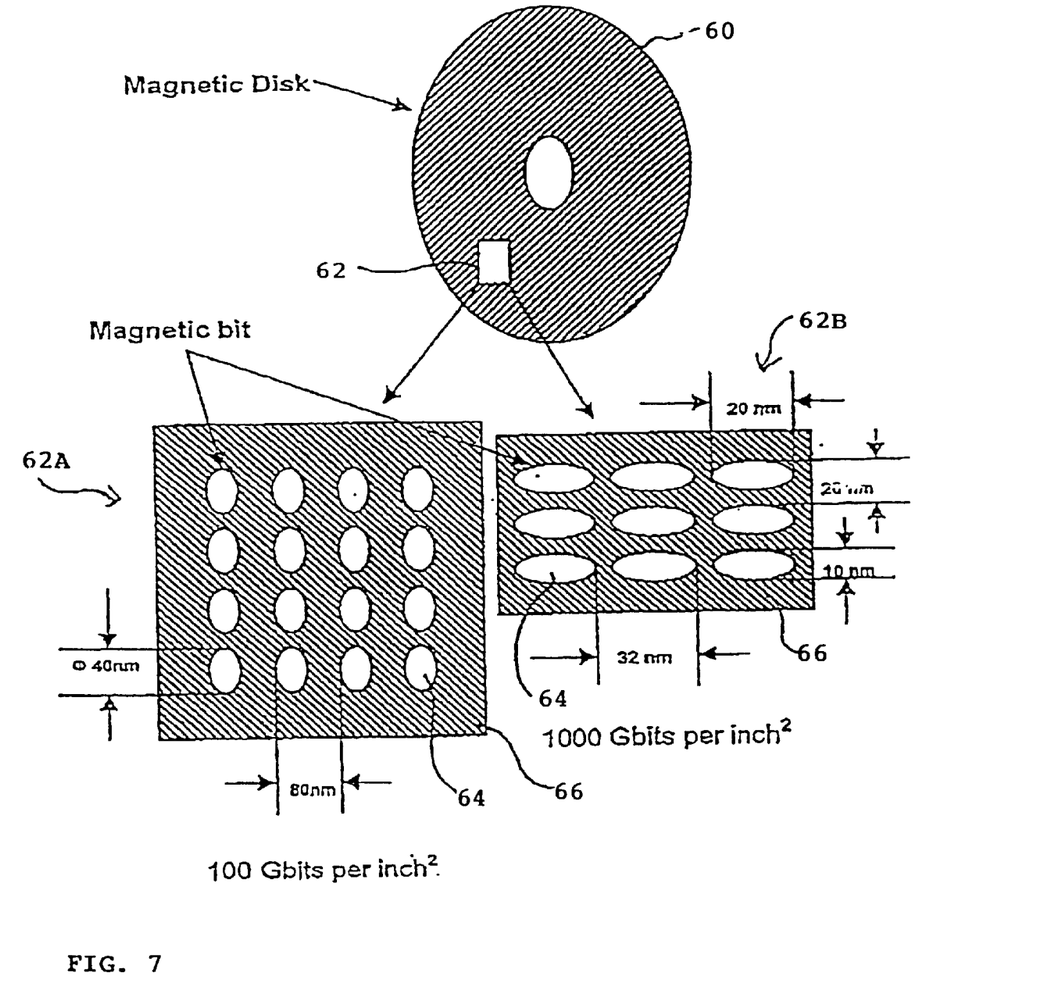
FIG. 7 is a schematic illustration of a high-density magnetic storage medium, in accordance with one embodiment of the present invention.

FIG. 7 is a schematic illustration of a high-density magnetic storage medium 60 that can be prepared by the methods of the present invention. By way of example, the storage medium 60 may correspond to the patterned substrates shown in FIGS. 3–6 after conversion of the potentially magnetic material from its non magnetic state to its magnetic state. The storage medium 60 generally comprises a patterned magnetic structure 62 that includes a two dimensional array of magnetic elements 64 positioned in a non-magnetic matrix 66, i.e., an ordered array of magnetic regions (64) separated by non-magnetic regions (66). Although the magnetic structure is shown as two-dimensional it should be understood that this is not a limitation and that its configuration may vary according to the specific needs of each device.

The patterned magnetic structure 62 can be configured to store a wide range of bits. In patterned magnetic structure 62A, for example, the magnetic elements 64 may be configured to store 100 Gbits per inch$^2$, and in patterned magnetic structure 62B, the magnetic elements 64 may be configured to store 1000 Gbits per inch$^2$. Referring to patterned magnetic structure 62A, the magnetic elements 64 may represent oval magnetic bits, which are 40 nm long and which are separated by 80 nm in a first direction. Referring to patterned magnetic structure 62B, the magnetic elements 64 may represent oval magnetic bits, which are 20 nm long and which are separated by 20 nm in a first direction and by 32 nm in a second direction. In addition, the magnetic bits may have a width of 10 nm. It should be noted that the above examples are not a limitation and may vary according to the specific needs of each device. For high density data storage, pattern (bit) size and spaces are required to be as small as possible. Currently, bit size and spaces can be as low as 10 nm.

Figure 8:
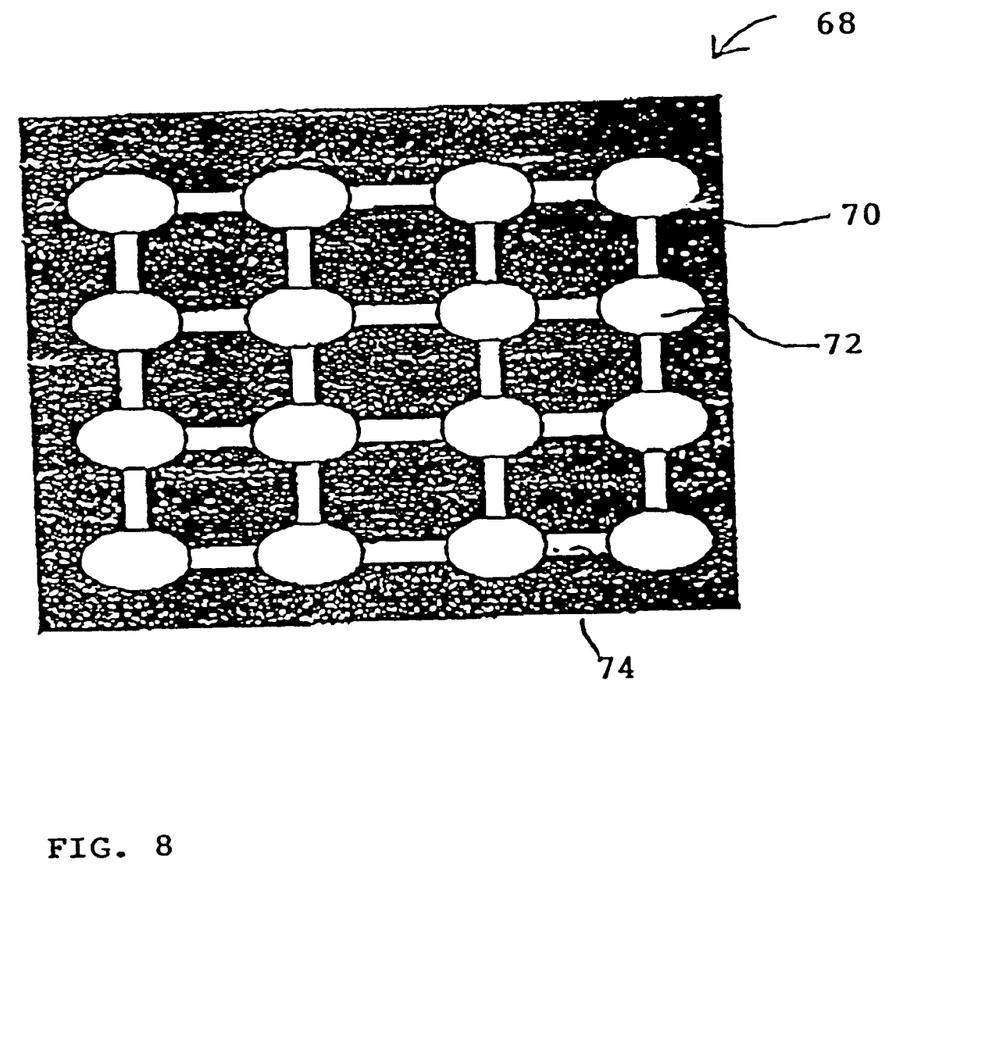
FIG. 8 is a broken away top view of an exemplary mask used to form a patterned nanostructure, in accordance with one embodiment of the invention.

FIG. 8 is a broken away top view of an exemplary mask 68 used to form a patterned nanostructure 70, in accordance with one embodiment of the invention. By way of example, the mask may generally correspond to the masks shown in FIGS. 3–4 or FIGS. 5–6. As shown, the mask 68 includes a plurality of holes 72 that are aligned to form a patterned array as for example the two dimensional patterned array shown in FIG. 7. The holes 72 are typically connected to one another via a plurality of lines 74. In the illustrated embodiment, the holes 72 are oval shaped and the lines 74 are rectangular shaped. It should be understood, however, that this is not a limitation and that the shapes may vary according to the specific needs of each nanostructure. For example, the shape of the hole may be a line, a reticle, a square, a rectangular, a triangular, a circle, a hexagonal, and the like. Furthermore, the holes, which in this figure are rectangularly aligned, may also be aligned in other configurations such as square, hexagonal and the like.

To elaborate further, masks having the desired pattern and resolution may be formed from a variety of materials. A basic requirement for the mask is typically that it be highly resistive to the radiation beam. As such, there are typically different materials used for different beam sources. For ion or electron beam sources, the mask is generally formed from an insulative and adiabatic material having a thin and highly conductive film deposited thereon. By way of example, an insulative and adiabatic material may be formed from $SiO_2$, $Si_3N_4$ and the like. In addition, the film may be formed from gold, silver, copper, aluminum and the like. For X-ray or laser beam sources, the mask is generally formed from an adiabatic material such as $SiO_2$, $Si_3N_4$ and the like.

FIG. 9A is a side view, in cross section, of a substrate 80, in accordance with one embodiment of the present invention. By way of example, the substrate 60 may generally correspond to the substrates shown in FIGS. 3–6. The substrate 80 generally comprises a base 82 and a non-magnetic layer 84 that can be converted into a magnetic state by annealing and/or mixing. The non-magnetic layer 84 is disposed over the base 82. Although the non-magnetic layer 84 is shown as a single layer, it should be noted that this is not a limitation and that the non-magnetic layer 84 may also represent a multi layered non-magnetic material. To illustrate this, FIG. 9B shows the substrate 80 comprising a base 82 and a non-magnetic layer 84' consisting of a first non-magnetic layer 84A and a second non-magnetic layer 84B that can be converted into a magnetic state by annealing and/or mixing. As shown, the first nonmagnetic layer 84A is disposed over the second non-magnetic layer 84B and the second non-magnetic layer 84B is disposed over the base 82. It should be noted, however, that first and second layers is not a limitation and that the number of layers may vary according to the specific needs of each device.

Several embodiments of the non-magnetic material will now be disclosed. In one embodiment, the non-magnetic material is a material that when annealed is converted into Barium-ferrite or a substituted Barium ferrite. In another embodiment, the non-magnetic material is a material that when annealed is converted into Srontium-ferrite or substituted Srontium-ferrite. In another embodiment, the non-magnetic material is a material that when annealed is converted into Cobalt-ferrite or a substituted Cobalt-ferrite. In another embodiment, the non-magnetic material is a material that when annealed is converted into garnet. Substitute ferrite generally refers to a ferrite whose rare earth or transition metal elements are substituted by other rare earth or transition metal elements. Before annealing, they are non-magnetic. They can be single layered or multi-layered.

In other embodiments, the non-magnetic material is an Al/Mn or Al/Mn/C multilayer film, which upon annealing and/or mixing is converted into a magnetic MnAl or MnAlC alloy. In other embodiments, the non-magnetic material is a Bi/Mn or Bi/Mn/Al multilayer film, which upon annealing and/or mixing is converted into a magnetic MnBi or MnBiAl alloy. In other embodiments, the non-magnetic material is a Cr/M/Pt multilayer film which upon annealing and/or mixing is converted into magnetic $(Cr_{1-x}M_x)Pt_3$ compound, where M may be cobalt, nickel, iron, and/or manganese. Alternatively, Pt may be replaced with Y and/or Pd. In yet other embodiments, the non-magnetic material comprises a $Ni_xP_{1-x}$ alloy, a $Fe_xPt_{1-x}$ alloy, a $Fe_xZr_{1-x}$ alloy or a $Fe_xCr_{1-x}$ alloy.

Figure 9:
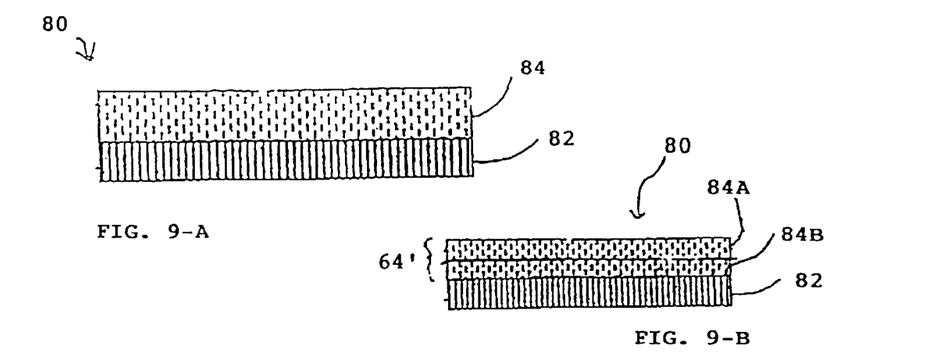
FIG. 9A is a side view, in cross section, of a substrate having a single layer of potentially magnetic material, in accordance with one embodiment of the present invention.
FIG. 9B is a side view, in cross section, of a substrate having multiple layers of a potentially magnetic material, in accordance with one embodiment of the present invention.
Figure 10:
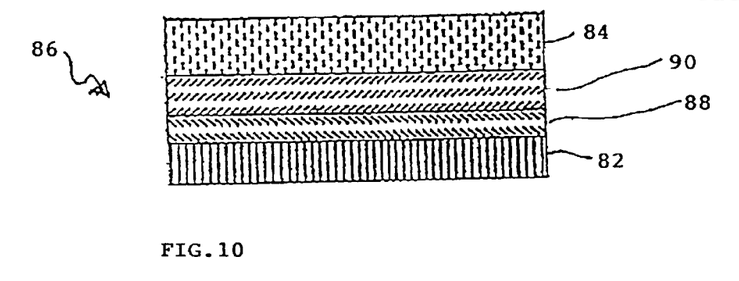
FIG. 10 is a side view, in cross section, of a substrate having an under layer or seed layer disposed below a potentially magnetic material, in accordance with another embodiment of the present invention.

FIG. 10 is a side view, in cross section, of a substrate 86, in accordance with another embodiment of the present invention. By way of example, the substrate 86 may generally correspond to the substrate 80 shown in FIG. 9. The substrate 86 generally comprises a base 82 and a non-magnetic layer 84 that can be converted into a magnetic state by annealing and/or mixing. The non-magnetic layer 84 is disposed over the base 82. Although the non-magnetic layer 84 is shown as a single layer, it should be noted that this is not a limitation and that the non-magnetic layer 84 may also represent a multi layered non-magnetic material. In this embodiment, the substrate 86 also comprises a seed layer 88 interposed between the base 82 and the non-magnetic layer 84. The seed layer 88 is configured to stabilize the non-magnetic nature of the non-magnetic layer 84 (single or multi layer). By way of example, the seed layer 88 may be formed from materials such as SiC, $Si_3N_4$ and the like. The substrate 86 may also comprise an underlayer 90 instead of or in addition to the seed layer 88. The underlayer 90 is configured to improve the magnetic properties of the medium itself and to promote the crystallization or alloying of the non-magnetic layer 84. In some cases, the underlayer is formed from multiple layers.

In one embodiment, the underlayer 90 is formed from a non magnetic and crystallized FeZr alloy and the non-magnetic layer 84 is formed from an amorphous $FexZr_{1-x}$ alloy. In another embodiment, the underlayer 90 is formed from a non-magnetic and crystallized MnAl alloy and the non magnetic layer 84 is formed from a Mn/Al multilayer film. In another embodiment, the underlayer 90 is a double layer (e.g., metal film having high conductance), that is formed from such materials as gold, silver, copper, aluminum and/or the like, and crystallized Zn-ferrite and the non-magnetic material 84 is an amorphous cobalt-ferrite or cobalt substituted ferrite, for example, $Co_{1-x}M_xFe_2O_4$, where M can be iron, zinc, manganese, nickel, copper, and the like.

Figure 11:
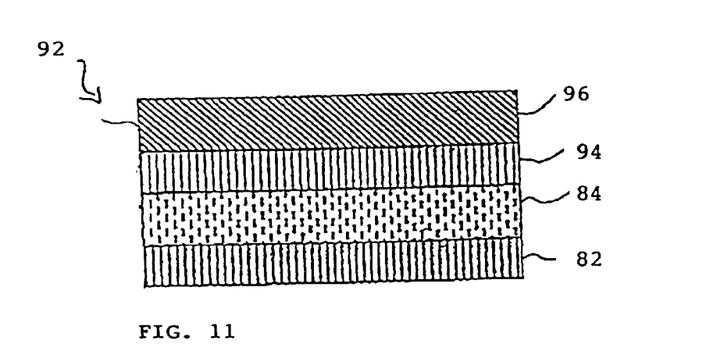
FIG. 11 is a side view, in cross section, of a substrate having an overcoat andlor lubricant layer disposed over a potentially magnetic material, in accordance with another embodiment of the present invention.

FIG. 11 is a side view, in cross section, of a substrate 92 after treatment, i.e., annealing and/or mixing of the non-magnetic layer 84, in accordance with another embodiment of the present invention. By way of example, the substrate 92 may generally correspond to the substrates shown in FIGS. 9 & 10. The substrate 80 generally comprises a base 82 and a patterned magnetic layer 84 that has been converted into a magnetic state by annealing and/or mixing. In this embodiment, the treated patterned magnetic layer 84 is coated with an overcoat layer 90 and a lubricant layer 92. The term "overcoat layer" generally refers to a layer of thin film used to prevent the patterned magnetic layer 84 from corrosion and mechanical damage. By way of example, the overcoat layer 90 may be a layer of carbon deposited above the patterned magnetic layer 84. The term "lubricant layer" generally refers to a layer of thin film used to reduce friction force, minimize wear and the absorption of contaminants onto a carbon surface. By way of example, the lubricant layer 92 may be a layer of perfluoropolyether (PFPE). deposited above the overcoat layer 90. The overcoat and lubricant layers are advantageous for substrates relating to media applications such as long-term reliability of magnetic recording, high stability and the like. Although not shown, the substrate 86 may also include a metallic layer, inserted between the patterned magnetic layer 84 and the overcoat layer 90, configured to eliminate any static charge that may have developed on the surface of the patterned magnetic layer. The overcoat layer may also be configured to eliminate any static charge that may have developed on the surface of the patterned magnetic layer.

Figure 12:
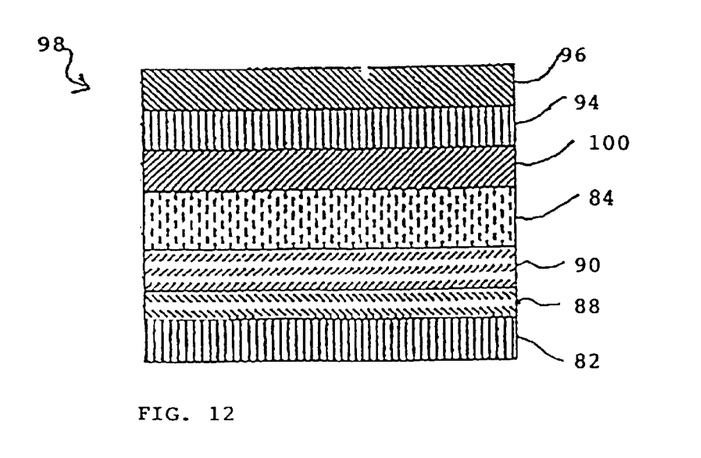
FIG. 12 is a side view, in cross section, of a substrate having a plurality of layers, in accordance with another embodiment of the present invention.

FIG. 12 is a side view, in cross section, of a substrate 98, in accordance with another embodiment of the present invention. By way of example, the substrate 98 may generally correspond to any of the substrates 80, 86 or 92 shown in FIGS. 9–11. The substrate 80 generally comprises a base 82 and a patterned magnetic layer 84 that has been converted into a magnetic state by annealing and/or mixing. The patterned magnetic layer 84 is disposed over the base 82. The substrate 98 also comprises a seed layer 88 and an underlayer 90 interposed between the base 82 and the non-magnetic magnetic layer 84. The seed layer 88 helps to stabilize the non-magnetic nature of the non-magnetic layer 84 (single or multi layer). The underlayer 90 improves the magnetic properties of the medium itself and helps promote the crystallization or alloying of the non-magnetic layer 84. The substrate 98 also comprises an overcoat layer 90 and a lubricant layer 92 for preventing the patterned magnetic layer 84 from corrosion and mechanical damage. The substrate 98 also comprises a metallic layer 100 disposed between the patterned magnetic layer 84 and the overcoat layer 90. The metallic layer 100 is configured to eliminate any static charge on the surface of the patterned magnetic layer 84 in the case of charged particle irradiation. By way of example, the metallic layer 100 may be formed from materials such as copper, silver, gold and the like.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method of converting a potentially magnetic material into a magnetic patterned nanostructure by using mask-controlled local phase transition.

2. The method as recited in claim 1 wherein the potentially magnetic material is a non-magnetic or weak-magnetic film.

3. The method as recited in claim 2 wherein the non-magnetic or weak-magnetic film is formed by a single layer.

4. The method as recited in claim 2 wherein the non-magnetic or weak-magnetic film is formed by multiple layers.

5. The method as recited in claim 1 wherein the phase transition is implemented by local annealing and/or mixing.

6. The method as recited in claim 5 wherein the annealing and/or mixing is carried out by subjecting the potentially magnetic material to a beam of radiation.

7. The method as recited in claim 6 wherein the beam is focussed.

8. The method as recited in claim 6 wherein the beam is unfocussed.

9. A method of producing a patterned magnetic nanostructure, the method comprising:
   providing a substrate having a non-magnetic single layer or multi layer film that can be converted into a magnetic state by annealing and/or mixing;
   covering the substrate with a mask having a desired pattern and resolution associated with the patterned magnetic nanostructure; and
   transferring the desired pattern from the mask to the film by converting desired portions of the non-magnetic film to a magnetic state via annealing and/or mixing.

10. The method as recited in claim 9 wherein converting select portions of the non-magnetic film to a magnetic state via annealing and/or mixing forms a patterned magnetic film comprising an ordered array of magnetic regions separated by non-magnetic regions. regions.

11. The method as recited in claim 10 wherein the ordered array is a two-dimensional array.

12. The method as recited in claim 9 wherein annealing and/or mixing is carried out by subjecting the mask-covered substrate to a beam of radiation.

13. The method as recited in claim 12 wherein the beam of radiation is an electron beam, an ion beam, a X-ray beam, or laser beam.

14. The method as recited in claim 12 wherein the beam of radiation is configured to provide sufficient energy to anneal and/or mix the non-magnetic film.

15. The method as recited in claim 14 wherein the beam of radiation is scanned across the mask-covered substrate.

16. The method as recited in claim 15 wherein the mask-covered substrate is moved while scanning the beam of radiation across the mask-covered substrate.

17. The method as recited in claim 15 wherein the mask-covered substrate is fixed while scanning the beam of radiation across the mask-covered substrate.

18. The method as recited in claim 14 wherein the mask-covered substrate and beam of radiation are fixed for a small substrate and a large beam spot.

19. The method as recited in claim 9 wherein the mask is placed a certain distance from the surface the film.

20. The method as recited in claim 9 wherein the mask includes a plurality of holes that are aligned in a pattern, and wherein the holes of the mask are connected with lines so as to form a net nano-structure.

21. The method as recited in claim 9 wherein the non-magnetic film is formed from a material which upon annealing is converted into Barium-ferrite or a substituted Barium-ferrite, Srontium-ferrite or substituted Srontium-ferrite, Cobalt-ferrite or a substituted Cobalt-ferrite or garnet.

22. The method as recited in claim 9 wherein the non-magnetic film is a Al/Mn or Al/Mn/C multi layer film which upon annealing and/or mixing is converted into magnetic MnAl or MnAlC alloy.

23. The method as recited in claim 9 wherein the non-magnetic film is a Bi/Mn or Bi/Mn/Al multi layer film which upon annealing and/or mixing is converted into magnetic MnBi or MnBiAl alloy.

24. The method as recited in claim 9 wherein the non-magnetic film is a Cr/M/Pt multi layer film which upon annealing and/or mixing is converted into magnetic $(Cr_{1-x}M_x)Pt_3$ compound, where, M is selected from Cobalt, Nickel, Iron, Manganese, Pt, Y and Pd.

25. The method as recited in claim 9 wherein the non-magnetic film comprises a $Ni_xP_{1-x}$ alloy, a $Fe_xPt_{1-x}$ alloy, a $Fe_xZr_{1-x}$ alloy, or a $Fe_xCr_{1-x}$ alloy.

26. The method as recited in claim 9 wherein the substrate further comprises an underlayer disposed below the non-magnetic film.

27. The method as recited in claim 26 wherein the underlayer is a layer of non-magnetic and crystallized FeZr alloy and the non-magnetic film is an amorphous $Fe_xZr_{1-x}$ alloy.

28. The method as recited in claim 26 wherein the underlayer includes a first layer of metal film with high conductance and a second layer of crystallized Zn-ferrite, and wherein the non-magnetic film is a Cobalt-ferrite or Cobalt-substituted ferrite.

29. The method as recited in claim 26 wherein the underlayer is layer of non-magnetic and crystallized MnAl alloy and the non-magnetic film is a Mn/Ai multi layer film.

30. The method as recited in claim 9 wherein the patterned magnetic nanostructure is part of a recording medium.

31. The method as recited in claim 30 wherein the substrate further comprises a top layer disposed over the patterned magnetic nanostructure.

32. The method as recited in claim 30 wherein the top layer is capable of eliminating the build-up of charge formed over the patterned magnetic nanostructure.

33. The method as recited in claim 30 wherein the substrate further comprises a lubricant layer disposed over the top layer.

34. A method of producing a patterned magnetic nanostructure, comprising:

providing a substrate having a single layer or multi layer film that can be converted into a magnetic state by annealing and/or mixing;

positioning a mask on or over the film, the mask having a desired pattern and resolution associated with the patterned magnetic nanostructure; and subjecting the mask-covered substrate to a beam of radiation having sufficient energy to locally anneal and/or mix the non-magnetic or weak-magnetic single-layer or multi layer film, whereby because of the mask only desired portions of the non-magnetic film are exposed to the beam of radiation to produce an array of magnetic elements in a non-magnetic matrix.

* * * * *